United States Patent
Kawahara

[11] Patent Number: 6,053,396
[45] Date of Patent: Apr. 25, 2000

[54] SCALE FORMATION-INHIBITORY AGENTS USED IN WELDING TREATMENTS AND METHOD FOR INHIBITING FORMATION OF A SCALE IN A WELDING TREATMENT OF METAL PARTS

[75] Inventor: Kan Kawahara, Tachikawa, Japan

[73] Assignee: Toyo Riken Corporation, Tachikawa, Japan

[21] Appl. No.: 08/965,025

[22] Filed: Nov. 5, 1997

[30] Foreign Application Priority Data

Nov. 8, 1996 [JP] Japan .................................. 8-296719

[51] Int. Cl.$^7$ .............................. B23K 1/20; B23K 35/34
[52] U.S. Cl. ......................... 228/214; 228/207; 228/223; 148/23
[58] Field of Search .................................. 228/207, 214, 228/223; 148/23

[56] References Cited

U.S. PATENT DOCUMENTS

| | | | |
|---|---|---|---|
| 4,072,607 | 2/1978 | Schiller et al. | 210/58 |
| 4,216,035 | 8/1980 | Bakos et al. | 148/23 |
| 4,456,675 | 6/1984 | Anderson, Jr. et al. | 430/256 |
| 4,504,007 | 3/1985 | Anderson, Jr. et al. | 228/123 |
| 4,539,222 | 9/1985 | Anderson, Jr. et al. | 427/88 |
| 4,923,617 | 5/1990 | Heilweil et al. | 210/698 |
| 5,120,917 | 6/1992 | Komatsu et al. | 219/117.1 |
| 5,156,744 | 10/1992 | Rideout et al. | 210/698 |
| 5,164,468 | 11/1992 | Ball et al. | 526/271 |
| 5,173,126 | 12/1992 | Ogura et al. | 148/23 |
| 5,398,865 | 3/1995 | Mittag | 228/219 |

FOREIGN PATENT DOCUMENTS

| | | |
|---|---|---|
| 61-2753 | 1/1986 | Japan . |
| 2504673 | 4/1996 | Japan . |
| 8-132239 | 5/1996 | Japan . |

*Primary Examiner*—Patrick Ryan
*Assistant Examiner*—Kiley Stoner
*Attorney, Agent, or Firm*—Oblon, Spivak, McClelland, Maier & Neustadt, P.C.

[57] ABSTRACT

A scale formation-inhibitory agent used in a welding treatment comprises a polymer selected from the group consisting of polymers having oxygen atoms in the main chain and polymers capable of being thermally depolymerized. The scale formation-inhibitory agent can inhibit the formation of scale on the surface of a metal part to be welded during a welding treatment.

19 Claims, No Drawings

6,053,396

SCALE FORMATION-INHIBITORY AGENTS USED IN WELDING TREATMENTS AND METHOD FOR INHIBITING FORMATION OF A SCALE IN A WELDING TREATMENT OF METAL PARTS

TITLE OF THE INVENTION

Scale formation-inhibitory agents used in welding treatments and method for inhibiting formation of a scale in a welding treatment of metal parts

BACKGROUND OF THE INVENTION

The present invention relates to a scale formation-inhibitory agent, which is used for preventing the formation, during welding, of any scale on the surface of a metal part to be welded during a welding treatment as well as a method for inhibiting formation of a scale in a welding treatment of metal parts.

Conventionally, Japanese Examined Patent Publication No. Sho 61-2753, for instance, discloses such agents for inhibiting, through heating, the discoloration of copper and copper alloys as those comprising boric acid and/or salts thereof. In addition, Japanese Patent No. 2504673 discloses a method which comprises the steps of applying a stock solution of a boric acid ester, a solution containing a boric acid ester or a suspension of boric acid powder to a portion to be joined and then heating the portion, as a method for brazing and soldering brass and copper parts or brass parts. In the technique disclosed in this patent, for instance, boric acid or a salt thereof is heated to thus form a glass-like coating film on the metal surface and the resulting film isolates the metal surface from the air to thus inhibit oxidation of metallic tubings. Therefore, the technique disclosed in the foregoing patent may suffer from such a problem that such a glass-like material is peeled off from the welded metallic tubings and if the welded tubings are used in, for instance, the piping for refrigerators and air conditioners, the glass-like material peeled off is transported to the compressors thereof during operation and this leads to, for instance, breakage of valves and/or seals.

Moreover, there has also been proposed a technique for inhibiting oxidation by applying an organic acid ester to the interior of a tubing when welding the tubing to thus make use of the reducing power of the organic acid ester or the thermal decomposition products thereof formed during heating the tubing at a high temperature (Japanese Un-Examined Patent Publication No. Hei 8-132239), but high molecular weight organic acid esters form soot and/or tar materials and this results in the formation of scale. On the other hand, low molecular weight organic acid esters which do not form soot or the like are quite volatile substances and they must therefore be used in a large quantity. In addition, the use of these substances requires a high airtightness in the interior of the portion to be joined.

SUMMARY OF THE INVENTION

A primary object of the present invention is to provide an agent which can inhibit the formation of scale on the surface of a metal to be welded during a welding treatment.

Another method of the invention is to provide a method for inhibiting the formation of any scale.

These and other objects of the invention will be apparent from the following description and Examples.

The inventors of this invention have conducted various studies to solve the foregoing problems and have found out that if a scale formation-inhibitory agent comprising a specific polymer is coated on the inner surface of a metal part and the coated polymer can isolate the foregoing metal part from the oxygen in the air at a temperature of not more than the thermal decomposition temperature of the polymer and can gradually be decomposed at a temperature of more than the thermal decomposition temperature to prevent the oxidation of the foregoing metal and to thus prevent the formation of any scale.

The present invention has been developed on the basis of the foregoing finding and provides a scale formation-inhibitory agent to be used in a welding treatment which comprises a polymer having oxygen atoms in the main chain or a polymer capable of being thermally depolymerized.

Moreover, the present invention also provides a method for inhibiting formation of a scale in a welding treatment of metal parts which comprises a step of welding metal parts in the presence of a scale formation-inhibitory agent between metal surfaces to be welded of the metal parts, the metal surfaces of which are contacting each other, the scale formation-inhibitory agent comprising a polymer having oxygen atoms in the main chain or a polymer capable of being thermally depolymerized.

The present invention also provides a method for welding metal parts which comprises the steps of applying the scale formation-inhibitory agent onto a metal surface, to be welded, of a metal part, further applying a molten brazing and soldering agent on the surface and contacting a metal surface of another metal part.

The present invention provides a metal part wherein the foregoing scale formation-inhibitory agent is applied onto the inner surface of a metal part which is possibly heated to an elevated temperature during a welding treatment.

The present invention further provides an article obtained by subjecting an article to a welding treatment while applying, thereto, the foregoing scale formation-inhibitory agent.

DESCRIPTION OF THE PREFERRED EMBODIMENTS

First of all, the scale formation-inhibitory agent according to the present invention will be detailed below.

The scale formation-inhibitory agent according to the present invention comprises a specific polymer.

The specific polymer may be polymers each having oxygen atoms in the main chain thereof and polymers capable of being thermally depolymerized. The polymers each having oxygen atoms in the main chain and the polymers capable of being thermally depolymerized may be used in combination in the present invention.

As the polymers each having oxygen atoms in the main chain, preferably used in the present invention are those in which the number of carbon atoms in the hydrocarbon group existing between two neighboring oxygen atoms is not more than 6. The number of the carbon atoms in the hydrocarbon group is more preferably not more than 5, further preferably not more than 4, still further preferably not more than 3 and most preferably 1 to 2. Furthermore, if a hydrocarbon group is present at the terminal of the foregoing polymer molecule, the number of carbon atoms of the hydrocarbon group is preferably not more than 6, more preferably not more than 5, further preferably not more than 4, still further preferably not more than 3 and most preferably 1 to 2. Such polymers may, for instance, be those listed below:

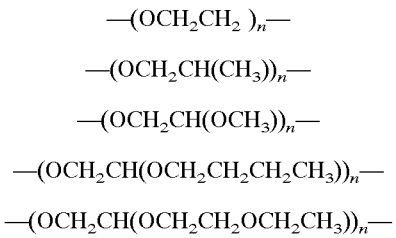

Specific examples of the foregoing polymers each having oxygen atoms in the main chain are polyalkylene glycols such as polyoxymethylene, polyethylene glycol and polypropylene glycol (diol type and triol type ones), poly (1-alkoxypropylene glycol) and poly(2-alkoxypropylene glycol); polyglycerol; polyalkylene carbonates such as polyethylene carbonate and polytrimethylene carbonate; poly (lactic acid), poly(glycolic acid), poly (β-hydroxypropionic acid) and poly (γ-hydroxybutyric acid); and polyacetals such as paraformaldehyde and paraacetaldehyde. Moreover, also usable herein include, for instance, copolymers of the monomers which constitute the foregoing polymers. Furthermore, the foregoing polymers may be used alone or in any combination of at least two of them, in the present invention.

The polymers capable of being thermally depolymerized may preferably be, for instance, those which can provide not less than 5 mole % of monomers which can be recovered through the depolymerization thereof. The amount of the monomers recovered through the depolymerization is more preferably not less than 10 mole %, further preferably not less than 15 mole %, still further preferably not less than 20 mole % and most preferably not less than 30 mole %.

Specific examples of the polymers capable of being thermally depolymerized are polystyrene type polymers such as polystyrene and poly(α-methylstyrene); polyolefins such as polyethylene, polypropylene, polybutadiene and polyisobutylene; poly(alkyl (meth) acrylate) (the alkyl group is preferably those having 1 to 6 carbon atoms) such as poly(methyl (meth)acrylate) and poly(ethyl (meth) acrylate); polyacrylonitrile type polymers such as polyacrylonitrile and poly(α-chloroacrylonitrile); vinylic polymers such as polyvinyl chloride and polyvinyl bromide; polyvinylidene polymers such as polyvinylidene chloride; polyoxymethylene; and poly(γ-hydroxylactic acid). Moreover, also usable herein include, for instance, copolymers of the monomers which constitute the foregoing polymers; and copolymers of the monomers (hereinafter referred to as "depolymerizable monomers") which constitute the foregoing polymers and oligomers capable of being thermally depolymerized with other non-depolymerizable monomers. In this case, it is sufficient that at least one of the monomers constituting the copolymer is depolymerizable one and if the content of the depolymerizable monomer in the copolymer is sufficiently high, the other monomers must not necessarily be depolymerizable ones.

When using a copolymer of a thermally depolymerizable monomer and other monomers, the content of the depolymerizable monomer constituting the copolymer is preferably not less than 2 mole %, more preferably not less than 3 mole %, further preferably not less than 5 mole %, still further preferably not less than 10 mole % and most preferably not less than 25 mole %.

The foregoing polymer used in the present invention preferably has a molecular weight of not less than 100, more preferably not less than 200, further preferably not less than 300, still further preferably not less than 500, still further preferably not less than 1000 and most preferably not less than 3000. When the molecular weight of the polymer is too large, its viscosity is high, it is difficult to dissolve in a solvent, and invasion of brazing filter metal to a joint part and a gap part of a copper pipe may degrade at the time of brazing and soldering. Accordingly, the molecular weight of the polymer is preferably not more than 2,000,000, more preferably not more than 1,500,000, further preferably not more than 1,000,000, further preferably not more than 500,000, further preferably not more than 200,000, further preferably not more than 100,000, still further preferably not more than 50,000 and most preferable not more than 30,000. In this connection, the molecular weight of the foregoing polymer may be determined using, for instance, a monodisperse polystyrene as a standard sample.

The amount of the solid residue formed when the foregoing polymer is heated at 700° C. for one minute while isolating the polymer from the air is preferably not more than 3.0% by weight on the basis of the weight of the polymer determined prior to the heating. The amount of the solid residue is more preferably not more than 2.0% by weight, further preferably not more than 1.0% by weight, still further preferably not more than 0.5% by weight and most preferably not more than 0.2% by weight.

In the present invention, preferred are polyisobutylene (polybutene), polyalkylene glycols and poly(alkyl (meth) acrylates) among others and more preferably used are polyisobutylene, polyethylene glycol and poly(methyl methacrylate).

According to the agent for inhibiting the formation of any scale, the foregoing polymer may, as such, be applied onto the metallic inner surface or the polymer may, if necessary, be diluted with or dispersed in an appropriate solvent prior to the application thereof. When the polymer is diluted with or dispersed in an appropriate solvent, the amount of the solvent used is preferably selected such that the concentration of the polymer is not less than 0.5% by weight, more preferably not less than 1.0% by weight, further preferably not less than 2.0% by weight, still further preferably not less than 3.0% by weight and most preferably not less than 5.0% by weight.

In addition, the amount of the foregoing solvent used is preferably not more than 90% by weight, more preferably not more than 75% by weight, further preferably not more than 50% by weight, further preferably not more than 35% by weight, still further preferably not more than 30% by weight and most preferably not more than 20% by weight. When the amount of the solvent used is too high, invasion of brazing filter metal to a joint part and a gap part of a copper pipe may degrade at the time of brazing and soldering.

Specific examples of the foregoing solvents are saturated and unsaturated hydrocarbons such as pentane, hexane, cyclohexane and hexene; alcohols such as methanol, ethanol, propanol, isopropanol, butanol, sec-butanol, tert-butanol, amyl alcohol, isoamyl alcohol, active amyl alcohol and benzyl alcohol; polyhydric alcohols such as ethylene glycol, propylene glycol, butylene glycol, glycerin, pentanediol and hexylene glycol; ethers such as dimethyl ether, diethyl ether, methyl ethyl ether, dipropyl ether, diethylene glycol, diethylene glycol monomethyl ether, diethylene glycol dimethyl ether, diethylene glycol monoethyl ether, ethylene glycol monophenyl ether, tetrahydrofuran and dioxane; ketones such as acetone, methyl ethyl ketone, methyl isopropyl ketone, diisopropyl ketone, cyclopentanone, cyclohexanone, acetylacetone, acetophenone and propiophenone; esters such as ethyl formate, propyl formate, butyl formate, amyl formate, methyl acetate, ethyl acetate, diethylene glycol monomethyl acetate, diethylene glycol monoethyl acetate, ethyl acetoacetate, monoacetin, diacetin and triacetin; amides such as formamide, monomethyl formamide and dimethyl formamide; and water. These solvents may be used alone or in any combination of at least two of them.

Moreover, the agent for inhibiting the formation of any scale according to the present invention may optionally comprise other additives, for instance, boric acid and salts thereof such as lithium borate, sodium borate, potassium borate, beryllium borate, magnesium borate, calcium borate, barium borate, copper borate, zinc borate, tin borate, lead borate, bismuth borate, ammonium borate, monomethylammonium borate, dimethylammonium borate and trimethylammonium borate; boric acid esters such as methyl borate, ethyl borate, propyl berate, isopropyl borate, butyl borate, amyl borate and isoamyl borate; salts of organic acids such as formic acid, acetic acid, propionic acid, butyric acid, lactic acid, glycolic acid, citric acid, malonic acid, malic acid, succinic acid, pyruvic acid, acrylic acids and gallic acid, with lithium, sodium, potassium, beryllium, magnesium, calcium, barium, copper, zinc, tin, lead, bismuth, ammonium, monomethylammonium, dimethylammonium and trimethylammonium; complexes of ligands for chelate such as glycine, cystine, cysteine, asparagine, aspartic acid, alanine, arginine, isoleucine, glutamine, glutamic acid, serine, thyroxine, tyrosine, tryptophan, threonine, valine, histidine, hydroxyproline, hydroxylysine, phenylalanine, proline, methionine, lysine, leucine, iminodiacetic acid, dihydroxyethyl glycine, hydroxyethyl iminodiacetic acid, nitrilotriacetic acid, ethylenediaminetetraacetic acid, hydroxyethyl ethylenediaminetetraacetic acid, diethylenetriaminepentaacetic acid, triethylenetetraminehexaacetic acid, acetylacetone and ethyl acetoacetate, with lithium, sodium, potassium, beryllium, magnesium, calcium, barium, copper, zinc, tin, lead and bismuth; carbonates such as lithium carbonate, sodium carbonate, potassium carbonate, beryllium carbonate, magnesium carbonate, calcium carbonate, barium carbonate, copper carbonate, zinc carbonate, tin carbonate, lead carbonate, bismuth carbonate, ammonium carbonate, monomethylammonium carbonate, dimethylammonium carbonate and trimethylammonium carbonate; hydroxides such as lithium hydroxide, sodium hydroxide, potassium hydroxide, beryllium hydroxide, magnesium hydroxide, calcium hydroxide, barium hydroxide, copper hydroxide, zinc hydroxide, tin hydroxide, lead hydroxide, bismuth hydroxide, ammonium hydroxide, monomethylammonium hydroxide, dimethylammonium hydroxide and trimethylammonium hydroxide; and oxides such as lithium oxide, sodium oxide, potassium oxide, beryllium oxide, magnesium oxide, calcium oxide, barium oxide, copper oxide, zinc oxide, tin oxide, lead oxide and bismuth oxide, benzotriazole or salt thereof, 4-methylbenzotriazole (toluyl triazole), 5-methyl-benzotriazole (toluyl triazole), 4-carboxyl-benzotriazole and 5-carboxylbenzotriazole and ester or salt thereof. The amount of these additives to be added is preferably, on the basis of the weight of the foregoing polymer, not more than 30% by weight, more preferably not more than 20% by weight, still more preferably not more than 10% by weight and most preferably not more than 5% by weight. In addition, the amount of these additives to be added is preferably, on the basis of the weight of the foregoing polymer, not less than 0.001% by weight, more preferably not less than 0.005% by weight and still more preferably not less than 0.01% by weight.

The scale formation-inhibitory agent of the present invention may be applied onto the inner surface of a metal part prior to welding treatments according to any method and the agent can be charged in a pressure vessel along with a pressure carrier and used in the form of a spray. In this connection, the pressure carriers usable herein may be those known in this art and specific examples thereof include liquefied hydrocarbon gases, dimethyl ether, carbon dioxide gas, nitrogen gas and compressed air. Moreover, the pressure vessel may likewise be any conventionally known one, for instance, steel cans (inclusive of tin-plated and TFS cans), aluminum cans, duralumin cans and glass bottles.

Then the method for inhibiting the formation of any scale according to the present invention will hereinafter be described in more detail. The method of the present invention comprises the steps of welding a metal part while applying the scale formation-inhibitory agent of the present intention onto the inner surface of the metal part which is possibly heated to an elevated temperature during the welding treatment. In this respect, the term "welding" is used herein as a very wide meaning including brazing and soldering. It is preferable that the method comprise the steps of applying the scale formation-inhibitory agent onto a metal surface, to be welded, of a metal part, further applying a molten brazing and soldering agent on the surface and contacting a metal surface of another metal part with aid metal surface.

The method of the present invention is not particularly limited in the process for applying the scale formation-inhibitory agent onto the inner surface of the metal part and the process for carrying out welding and therefore, the processes may be carried out according to any conventionally known method.

The metals used in the welding treatment of the method for inhibiting the formation of any scale according to the present invention may be, for instance, copper, bronze, brass, cupronickel, iron, stainless steel, silver, chromium alloys, nickel alloys, aluminum, duralumin and vanadium alloys, but the present invention is not restricted to these specific examples.

In addition, the articles subjected to the step of welding in the method for inhibiting the formation of any scale are not limited to any specific one, but may be, for instance, refrigerators, air conditioners, tubings or pipings for refrigerators or the like, pipings for water supply, air pipings for operating machinery and tools, and fitting of blank plugs to these tubings or pipings.

The present invention will hereinafter be explained in more detail with reference to the following Examples, but the present invention is by no means limited to the following specific Examples.

EXAMPLE 1

A methanol solution containing 15% by weight of a polyethylene glycol (molecular weight: 3000) which was filled into a manual spray gun was applied onto a copper pipe and the interior of a joint through spraying and then they were joined through brazing and soldering with phosphorus-copper brazing filter metal using an oxygen-acetylene flame. The copper pipes having a length of 500 mm, outer diameters of 35 mm and 50 mm were used in this Example, while using joints adapted for the corresponding copper pipes having different outer diameters. In this respect, the way how the compound in the coated scale formation-inhibitory agent flows down as well as the gas flow (flows of air and reducing gases generated when the compound coated is heated) in the pipe may substantially vary depending on the inclination of the pipe. Therefore, the copper pipe was subjected to brazing and soldering while arranging the pipe horizontally and perpendicularly. Moreover, the gas flow in the interior of the pipe may likewise vary depending on whether the pipe has a closed end or an open end. For this reason, the test was carried out using both type of pipes each having a closed end or an open end.

In this Example, the soldering was carried out after allowing, to stand, the copper pipe and the joint coated with the solution of polyethylene glycol in methanol at room temperature for 17 hours and then drying them in the air maintained at 50° C. for one hour, in order to eliminate any possible effect of the gasified solvent as a reducing gas. Incidentally, such drying operations are not necessary in the practical use of such a solution.

[Evaluation of Scale Formation-Inhibitory Agent]

After soldering according to the foregoing operations, the welded article was visually observed to evaluate the degree of the scale formation on the basis of the following evaluation standard. The results thus obtained are summarized in [Table 1]. In addition, if scale was formed, the scale was scraped and collected followed by heating the same to thus determine whether the scale was combustible one (organic scale: Or) or incombustible one (inorganic scale: In) and the results thus obtained are also listed in Table 1.

⊚: There is not observed any formation of scale at all and the interior of the copper pipe maintains its metallic luster.

○: There is not observed any formation of scale, but the interior of the copper pipe loses its metallic luster.

Δ: There is observed a small amount of scale on the interior of the copper pipe.

X: There is observed a large amount of scale on the interior of the copper pipe.

EXAMPLE 2

The same procedures used in Example 1 were repeated except that an ethyl acetate solution containing 15% by weight of poly(methyl methacrylate)(molecular weight: 3000) was used instead of the solution of polyethylene glycol in methanol used in Example 1 and the resulting articles were inspected for the formation of scale using the same method used in Example 1. The results thus observed are listed in Table 1 given below.

EXAMPLE 3

The same procedures used in Example 1 were repeated except that a toluene solution containing 10% by weight of poly(α-methylstyrene) (molecular weight:3000) was used instead of the solution of polyethylene glycol in methanol used in Example 1 and the resulting articles were inspected for the formation of scale using the same method used in Example 1. The results thus observed are listed in Table 1 given below.

EXAMPLE 4

The same procedures used in Example 1 were repeated except that a diisopropyl ether solution containing 10% by weight of polyisobutylene(molecular weight:3700) was used instead of the solution of polyethylene glycol in methanol used in Example 1 and the resulting articles were inspected for the formation of scale using the same method used in Example 1. The results thus observed are listed in Table 1 given below.

EXAMPLE 5

The same procedures used in Example 1 were repeated except that a hexane solution containing 10% by weight of polybutadiene(molecular weight:2000) was used instead of the solution of polyethylene glycol in methanol used in Example 1 and the resulting articles were inspected for the formation of scale using the same method used in Example 1. The results thus observed are listed in Table 1 given below.

EXAMPLE 6

The same procedures used in Example 1 were repeated except that a diisopropyl ether solution containing 10% by weight of polyisobutylene(molecular weight:800) was used instead of the solution of polyethylene glycol in methanol used in Example 1 and the resulting articles were inspected for the formation of scale using the same method used in Example 1. The results thus observed are listed in Table 2 given below.

EXAMPLE 7

The same procedures used in Example 1 were repeated except that a diisopropyl ether solution containing 10% by weight of polyisobutylene(molecular weight:60000) was used instead of the solution of polyethylene glycol in methanol used in Example 1 and the resulting articles were inspected for the formation of scale using the same method used in Example 1. The results thus observed are listed in Table 2 given below.

Comparative Example 1

The same procedures used in Example 1 were repeated except that the solution of polyethylene glycol in methanol used in Example 1 was not applied to articles and the resulting articles were inspected for the formation of scale using the same method used in Example 1. The results thus observed are listed in Table 2 given below.

Comparative Example 2

The same procedures used in Example 1 were repeated except that a methanol solution containing 15% by weight of ethyl lactate was used instead of the solution of polyethylene glycol in methanol used in Example 1 and the resulting articles were inspected for the formation of scale using the same method used in Example 1. The results thus observed are listed in Table 2 given below.

Comparative Example 3

The same procedures used in Example 1 were repeated except that a methanol solution containing 15% by weight of ethyl pyruvate was used instead of the solution of polyethylene glycol in methanol used in Example 1 and the resulting articles were inspected for the formation of scale using the same method used in Example 1. The results thus observed are listed in Table 2 given below.

Comparative Example 4

The same procedures used in Example 1 were repeated except that an aqueous solution containing 15% by weight of polyvinyl alcohol was used instead of the solution of polyethylene glycol in methanol used in Example 1 and the resulting articles were inspected for the formation of scale using the same method used in Example 1. The results thus observed are listed in Table 2 given below.

TABLE 1

Degree of Scale-Formation Observed Upon Welding of Copper Pipes

| Ex. No. | Copper Pipe, Diameter and Arrangement | Closed End | Open End |
|---|---|---|---|
| 1 | 50 mm; horizontal | ◎ | ◎ |
| 1 | 50 mm; perpendicular | ◎ | ◎ |
| 1 | 35 mm; horizontal | ◎ | ◎ |
| 1 | 35 mm; perpendicular | ◎ | ◎ |
| 2 | 50 mm; horizontal | ◎ | ◎ |
| 2 | 50 mm; perpendicular | ◎ | ◎ |
| 2 | 35 mm; horizontal | ◎ | ◎ |
| 2 | 35 mm; perpendicular | ◎ | ◎ |
| 3 | 50 mm; horizontal | ◎ | ◎ |
| 3 | 50 mm; perpendicular | ◎ | ◎ |
| 3 | 35 mm; horizontal | ◎ | ◎ |
| 3 | 35 mm; perpendicular | ◎ | ◎ |
| 4 | 50 mm; horizontal | ◎ | ◎ |
| 4 | 50 mm; perpendicular | ◎ | ◎ |
| 4 | 35 mm; horizontal | ◎ | ◎ |
| 4 | 35 mm; perpendicular | ◎ | ◎ |
| 5 | 50 mm; horizontal | ◎ | ◎ |
| 5 | 50 mm; perpendicular | ◎ | ◎ |
| 5 | 35 mm; horizontal | ◎ | ◎ |
| 5 | 35 mm; perpendicular | ◎ | ◎ |

TABLE 2

Degree of Scale-Formation Observed Upon Welding of Copper Pipes

| Ex. No. | Copper Pipe, Diameter and Arrangement | Closed End | Open End |
|---|---|---|---|
| 6 | 50 mm; horizontal | ◎ | ◎ |
| 6 | 50 mm; perpendicular | ◎ | ◎ |
| 6 | 35 mm; horizontal | ◎ | ◎ |
| 6 | 35 mm; perpendicular | ◎ | ◎ |
| 7 | 50 mm; horizontal | ◎ | ◎ |
| 7 | 50 mm; perpendicular | ◎ | ◎ |
| 7 | 35 mm; horizontal | ◎ | ◎ |
| 7 | 35 mm; perpendicular | ◎ | ◎ |
| 1* | 50 mm; horizontal | X (In) | X (In) |
| 1* | 50 mm; perpendicular | X (In) | X (In) |
| 1* | 35 mm; horizontal | X (In) | X (In) |
| 1* | 35 mm; perpendicular | X (In) | X (In) |
| 2* | 50 mm; horizontal | ○ | X (In) |
| 2* | 50 mm; perpendicular | △ (In) | △ (In) |
| 2* | 35 mm; horizontal | ◎ | △ (In) |
| 2* | 35 mm; perpendicular | ○ | X (In) |
| 3* | 50 mm; horizontal | ○ | X (In) |
| 3* | 50 mm; perpendicular | △ (In) | X (In) |
| 3* | 35 mm; horizontal | ◎ | X (In) |
| 3* | 35 mm; perpendicular | ○ | X (In) |
| 4* | 50 mm; horizontal | △ (Or) | ○ |
| 4* | 50 mm; perpendicular | △ (Or) | ○ |
| 4* | 35 mm; horizontal | X (Or) | △ (Or) |
| 4* | 35 mm; perpendicular | X (Or) | △ (Or) |

*: Comparative Example

As seen from the data listed in Table 1, when a copper pipe was subjected to a welding treatment after applying, to the copper pipe, a scale formation-inhibitory agent comprising a polymer having oxygen atoms in the main chain thereof or a thermally depolymerizable polymer (Examples 1–7), there was not observed, at all, any oxidation of the interior of the copper pipe irrespective of the type and arrangement of the pipe (closed end or open end; and horizontal or perpendicular) and there was not observed, at all, the generation or formation of soot, tar materials and/or scale originated from the polymer applied to the copper pipe. Contrary to this, when any scale formation-inhibitory agent was not applied (Comparative Example 1), there was observed the formation of inorganic scale. The inorganic scale would be copper oxide formed through the oxidation of the copper pipe. Furthermore, when the welding treatment was carried out after the application of a low molecular weight ester (Comparative Examples 2 and 3), there was not observed any severe formation of scale at the closed end, while there was not observed any scale formation-inhibitory effect at the open end. Moreover, the scale formed was found to be inorganic one, i.e., copper oxide. These results may indicate that the low molecular weight ester undergoes complete volatilization at the temperature at which the soldering is carried out and accordingly, the ester cannot prevent the formation of any scale at all. In addition, when using a polymer which does not have any oxygen atom in the main chain and is not thermally depolymerizable (Comparative Example 4), the formation of scale was observed when using a copper pipe having a diameter of 35 mm and at the closed end. The scale formed in this case was found to be an organic one and accordingly, the polymer applied onto the pipe would be converted into a tar material by heating.

The application of the solution was carried out using aerosols that filled up the solution of Examples 1–7 with 20% by weight of dimethyl ether as pressure carrier, and aerosols that filled up the solution of Examples 1–7 with 40% by weight of LPG(3.0 atm at 25° C.) as pressure carrier. The results obtained were similar as in the cases of using a manual spray gun. In this case, working efficiency of the application increased due to the unnecessity of injecting the solution manually. A tendency in which the solution in the aerosole causes explosion at the time of heating by brazing and soldering was reduced. As for this reason, it is considered that an extremely high volatile pressure carrier makes the solvent filled up to aerosol vaporize. When the solvent is diisopropyl ether in example 4, such tendency was remarkable.

The scale formation-inhibitory agent according to the present invention permits the inhibition of the formation of any scale during welding treatments of metals. In addition, the method for inhibiting the formation of any scale according to the present invention also permits the inhibition of the formation of any scale during welding treatments of metals.

What is claimed is:

1. A method for inhibiting formation of a scale in a welding treatment of metal parts, comprising:
    applying a polymer to metal surfaces of metal parts to be welded,
    wherein the polymer has a molecular weight of not less than 500 and is selected from the group consisting of (a) thermally depolymerizable polymers which can provide not less than 5 mole % of monomers which can be recovered through the depolymerization thereof and (b) polymers having hydrocarbon groups and oxygen atoms in the main chain, wherein the number of carbon atoms of a hydrocarbon group between two neighboring oxygen atoms is not more than 6; and
    welding the metal parts.

2. The method of claim 1, wherein welding is carried out under heating.

3. The method of claim 1, wherein welding is carried out by brazing or soldering.

4. The method of claim 1, which comprises applying the applying the polymer to a metal surface, to be welded, of a metal part, and brazing or soldering the surface of the metal part to a metal surface of another metal part.

5. The method of claim 1, wherein a molecular weight of the polymer is not less than 100.

6. The method of claim 1, wherein an amount of the solid residue formed when the polymer is heated at 700° C. for one minute while isolating the polymer from the air is not more than 3.0% by weight on the basis of the weight of the polymer determined prior to the application of heat.

7. The method of claim 1, wherein the polymer is applied in the form of solution.

8. The method of claim 1, wherein the polymer is sprayed onto the metal surface to be welded.

9. The method of claim 7, which the polymer is charged in a pressure vessel together with a pressure carrier and is used in the form of a spray.

10. The method of claim 1, wherein the polymer is selected from the group consisting of polyisobutylene, polyalkylene glycols and poly(alkyl (meth)acrylates).

11. The method of claim 1, wherein the polymer has a molecular weight of not less than 3000.

12. The method of claim 1, wherein the polymer has a molecular weight of not more than 2,000,000.

13. The method of claim 11, wherein the polymer has a molecular weight of not more than 2,000,000.

14. A method for inhibiting formation of a scale in a welding treatment of metal parts, comprising:

coating a polymer selected from the group consisting of polyisobutylene, polyalkylene glycols and poly(alkyl (meth)acrylates) solubilized or dispersed in a solvent onto a metal surface, to be welded, of a metal part, and brazing or soldering the surface of the metal part to a metal surface of another metal part, wherein the polymer has a molecular weight of not less than 500.

15. The method of claim 14, wherein the polymer is selected from the group consisting of polyisobutylene, polyethylene glycol and poly(methyl methacrylate).

16. The method of claim 14, wherein the coating is carried out by spraying the scale formation-inhibitory solution onto the surface of the metal part to be welded.

17. The method of claim 14, wherein the polymer has a molecular weight of not less than 3000.

18. The method of claim 14, wherein the polymer has a molecular weight of not more than 2,000,000.

19. The method of claim 17, wherein the polymer has a molecular weight of not more than 2,000,000.

* * * * *